(12) United States Patent
Chen et al.

(10) Patent No.: US 10,246,264 B2
(45) Date of Patent: Apr. 2, 2019

(54) ROLLER TRAIN AND SUBSTRATE CONVEYING DEVICE

(71) Applicants: BOE TECHNOLOGY GROUP CO., LTD., Beijing (CN); CHENGDU BOE OPTOELECTRONICS TECHNOLOGY CO., LTD., Sichuan Province (CN)

(72) Inventors: Baiyu Chen, Beijing (CN); Wei Chen, Beijing (CN); Maosheng He, Beijing (CN); Qing Liu, Beijing (CN); Pengfei Fan, Beijing (CN); Yaojun Lv, Beijing (CN)

(73) Assignees: BOE TECHNOLOGY GROUP CO., LTD., Beijing (CN); CHENGDU BOE OPTOELECTRONICS TECHNOLOGY CO., LTD., Sichuan Province (CN)

( * ) Notice: Subject to any disclaimer, the term of this patent is extended or adjusted under 35 U.S.C. 154(b) by 0 days.

(21) Appl. No.: 15/703,637

(22) Filed: Sep. 13, 2017

(65) Prior Publication Data

US 2018/0105367 A1  Apr. 19, 2018

(30) Foreign Application Priority Data

Oct. 19, 2016 (CN) .............................. 201610913090

(51) Int. Cl.
*B65G 39/02* (2006.01)
*B65G 49/06* (2006.01)
(Continued)

(52) U.S. Cl.
CPC .............. *B65G 39/02* (2013.01); *B65G 13/00* (2013.01); *B65G 49/06* (2013.01); *B65G 49/064* (2013.01); *C03C 21/001* (2013.01); *G02F 1/13* (2013.01)

(58) Field of Classification Search
CPC ........... B65G 39/16; B65G 39/02; H05K 3/00
See application file for complete search history.

(56) References Cited

U.S. PATENT DOCUMENTS

2005/0103601 A1\* 5/2005 Hubel ................. B65G 21/209
  198/780
2010/0116623 A1  5/2010 Du et al.
2013/0092511 A1  4/2013 Liu et al.

FOREIGN PATENT DOCUMENTS

CN  201882633 U   6/2011
CN  204223714 U   3/2015
(Continued)

OTHER PUBLICATIONS

First Office Action for Chinese Application No. 201610913090.2, dated Oct. 9, 2018, 8 pages.

*Primary Examiner* — Gene O Crawford
*Assistant Examiner* — Lester Rushin, III
(74) *Attorney, Agent, or Firm* — Brooks Kushman P.C.

(57) ABSTRACT

A roller train and a substrate conveying device are provided. The roller train is used for a substrate and includes a first roller including a first delimitation part, and a second roller including a second delimitation part. An axial line of the first roller is parallel to that of the second roller; the first roller and the second roller contact an upper surface and a lower surface of the substrate, respectively; and, the first delimitation part and the second delimitation part are arranged on the first axis and the second axis, respectively, and configured to delimit axial displacement of the first roller and the second roller, respectively. The first delimitation part and the second delimitation part cooperate to prevent misalignment between the first roller and the second roller.

20 Claims, 6 Drawing Sheets

(51) Int. Cl.
 B65G 13/00 (2006.01)
 C03C 21/00 (2006.01)
 G02F 1/13 (2006.01)

(56) References Cited

FOREIGN PATENT DOCUMENTS

DE 102009002293 A1 5/2010
JP H09129702 A 5/1997

\* cited by examiner

ROLLER TRAIN AND SUBSTRATE CONVEYING DEVICE

CROSS-REFERENCE TO RELATED APPLICATION

This application claims priority to Chinese Patent Application No. 201610913090.2 filed on Oct. 19, 2016, which is incorporated herein by reference in its entirety.

TECHNICAL FIELD

The present disclosure relates to a technical field of conveying a substrate, and in particular to a roller train and a substrate conveying device.

BACKGROUND

In a relevant manufacture process of a Thin Film Transistor-Liquid Crystal Display (TFT-LCD), electrode patterns need to be formed on a surface of a substrate by wet-etching. When performing the wet-etching, etching agents need to be sprayed onto the substrate to form the patterns on the substrate, and such spraying occurs during conveying the substrate. However, spraying the etching agents on the substrate may generate a relatively large force on the substrate, such that large friction occurs between the substrate and rollers of a substrate conveying device and hinders the substrate from being conveyed. For this, a roller train is used to convey the substrate when spraying the etching agents onto the substrate. That is, the substrate is placed between two rollers arranged oppositely to each other and is conveyed by the two rollers, and thereby the substrate is conveyed.

However, during conveying the substrate, an upper roller and a lower roller of the roller train may displacement axially relative to each other, resulting in misalignment between the upper roller and the lower roller. Such misalignment may cause deformation or even crush of the substrate between the two rollers.

SUMMARY

A roller train for conveying a substrate is provided in the present disclosure, and includes: a first roller including a first delimitation part, and a second roller including a second delimitation part, wherein an axial line of a first axis of the first roller is parallel to that of a second axis of the second roller, the first roller contacts an upper surface of the substrate, the second roller contacts a lower surface of the substrate, and the first delimitation part is arranged on the first axis of the first roller and configured to delimit an axial displacement of the first roller, the second delimitation part is arranged on the second axis of the second roller and configured to delimit an axial displacement of the second roller, the first delimitation part and the second delimitation part cooperate with each other to prevent misalignment between the first roller and the second roller.

A substrate conveying device is further provided in the present disclosure, and includes the above roller train.

BRIEF DESCRIPTION OF THE DRAWINGS

The drawings herein are provided to enhance understanding of the present disclosure and constitute a part of the present disclosure, but do not constitute any delimitation to the present disclosure.

REFERENCE NUMERALS

| | |
|---|---|
| 1-first roller, | 2-second roller; |
| 3-substrate, | 4-first delimitation part; |
| 5-second delimitation part, | 51-second delimitation body; |
| 52-left delimitation plate, | 53-right delimitation plate; |
| 11-first axis, | 12-first roller body; |
| 21-second axis, | 22-second roller body; |
| L1-width of a groove, | L2-thickness of first delimitation part; |
| S1-thickness of first roller body; | |
| S2-thickness of second roller body; | |
| 6-first fastening knob, | 7-second fastening knob; |
| 8-first expansion washer, | 9-second expansion washer; |
| 121-first left roller body, | 122-first right roller body; |
| 41-first left delimitation part, | 42-first right delimitation part; |
| 221-second left roller body, | 222-second right roller body; |
| 511-second left delimitation part, | 512-second right delimitation part. |

DETAILED DESCRIPTION

In order to further describe a roller train and a substrate conveying device provided in the embodiments of the present disclosure, detailed description will be provided hereinafter in details with reference to the drawings.

Figure 1:
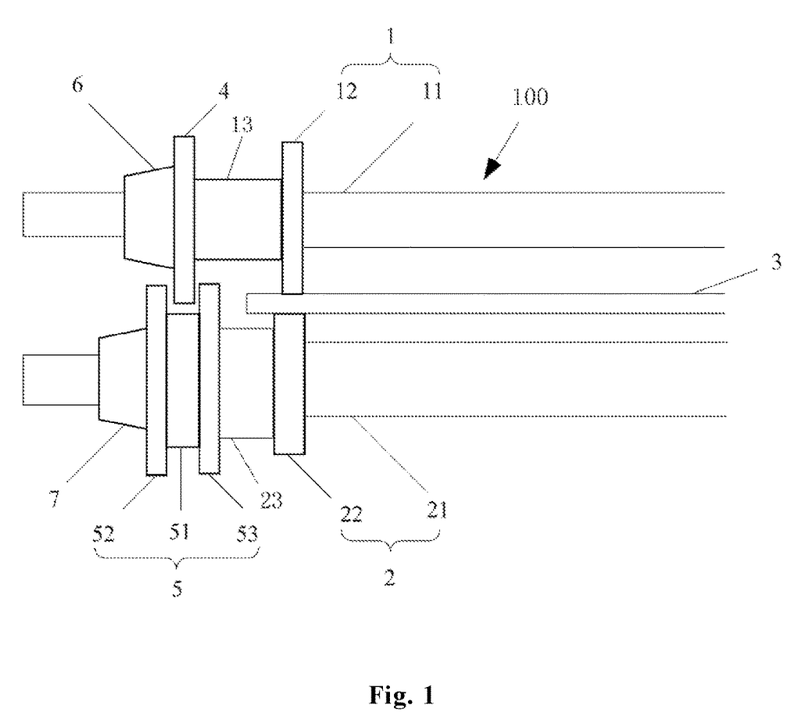
FIG. 1 is a schematic view of a roller train provided in embodiments of the present disclosure.

A roller train and a substrate are provided in the embodiments of the present disclosure to prevent an upper roller and a lower roller of the roller train from being misaligned with each other and prevent a substrate from being deformed. Referring to FIG. 1, a roller train 100 provided in the embodiments of the present disclosure includes a first roller 1 and a second roller 2. The first roller 1 is located at an upper surface of a substrate 3, the second roller 2 is located at a lower surface of the substrate 3, and an axial line of an axis of the first roller 1 is parallel to that of an axis of the second roller 2. A first delimitation part 4 is arranged on the axis of the first roller 1 and is configured to delimit an axial displacement of the first roller 1. A second delimitation part 5 is arranged on the axis of the second roller 2 and is configured to delimit an axial displacement of the second roller 2. The first delimitation part 4 and the second delimitation part 5 cooperate with each other to prevent the first roller 1 and the second roller 2 from being misaligned with each other.

When installing the roller train 100, the central line of the axis of the first roller 1 is arranged to be parallel to the central line of the axis of the second roller 2, the first delimitation part 4 is arranged on the axis of the first roller 1, and the second delimitation part 5 cooperating with the first delimitation part 4 is arranged on the axis of the second roller 2. When the substrate 3 is positioned between the first roller 1 and the second roller 2, if an axial displacement of the first roller 1 occurs, the first delimitation part 4 may delimit the axial displacement of the first roller 1. Similarly, if an axial displacement of the second roller 2 occurs, the second delimitation part 5 may delimit the axial displacement of the second roller 2. Misalignment between the first roller 1 and the second roller 2 may be prevented by cooperation between the first delimitation part 4 and the second delimitation part 5.

In the roller train provided in the embodiments of the present disclosure, the axial displacement of the first roller 1 may be delimited by arranging the first delimitation part 4 on the axis of the first roller 1, and the axial displacement of the second roller 2 may be delimited by arranging the second delimitation part 5 on the axis of the second roller 2. The misalignment between the first roller 1 and the second roller 2 may be prevented by the cooperation between the first delimitation part 4 and the second delimitation part 5. Therefore, when the roller train provided in the embodiments of the present disclosure is used to convey the substrate 3, not only the substrate 3 may be conveyed by the first roller 1 and the second roller 2, but also the misalignment between the first roller 1 and the second roller 2 may be prevented by the cooperation between the first delimitation part 4 and the second delimitation part 5. In this way, a torque caused by the misalignment between the first roller 1 and the second roller 2 may be avoided and a possibility of deformation or even crush of the substrate 3 caused by the torque may be reduced.

It may be understood that the first delimitation part 4 may be arranged to be a ring-shape structure so that the first delimitation part 4 may be sleeved onto the axis of the first roller 1.

A specific structure of the second delimitation part 5 provided in the embodiments of the present disclosure will be described hereinafter with reference to FIG. 1. As shown in FIG. 1, the second delimitation part 5 is located at a left side of the second roller 2 and is spaced from the second roller 2 by a certain distance. The second delimitation part 5 provided in the embodiments of the present disclosure includes a second delimitation body 51, a left delimitation plate 52 and a right delimitation plate 53. The left delimitation plate 52 is arranged at a left side of the second delimitation body 51, and the right delimitation plate 53 is arranged at a right side of the second delimitation body 51. The second delimitation body 51, the left delimitation plate 52 and the right delimitation plate 53 are sleeved onto the axis of the second roller 2. A groove structure is formed by the second delimitation body 51, the left delimitation plate 52, and the right delimitation plate 53, so that the first delimitation part 4 may be inserted into the groove structure and be displaced axially inside the groove structure. As such, when the second roller 2 is displaced axially, the groove structure of the second delimitation part 5 may be displaced a same axial distance along the axial of the second roller 2. Because the first delimitation part 4 is inserted into the groove structure in the embodiments of the present disclosure, the second delimitation part 5 may be blocked by the first delimitation part 4 after being moved axially a certain distance, and thus the axial displacement of the second delimitation part 5 may be delimited and accordingly the axial displacement of the second roller 2 may be delimited. Therefore, the axial displacement of the second roller 2 may be delimited by the cooperation between the first delimitation part 4 and the second delimitation part 5 in the embodiments of the present disclosure, and the misalignment between the first roller 1 and the second roller 2 may be prevented and the possibility of deformation or even crush of the substrate 3 may be reduced.

Figure 2:
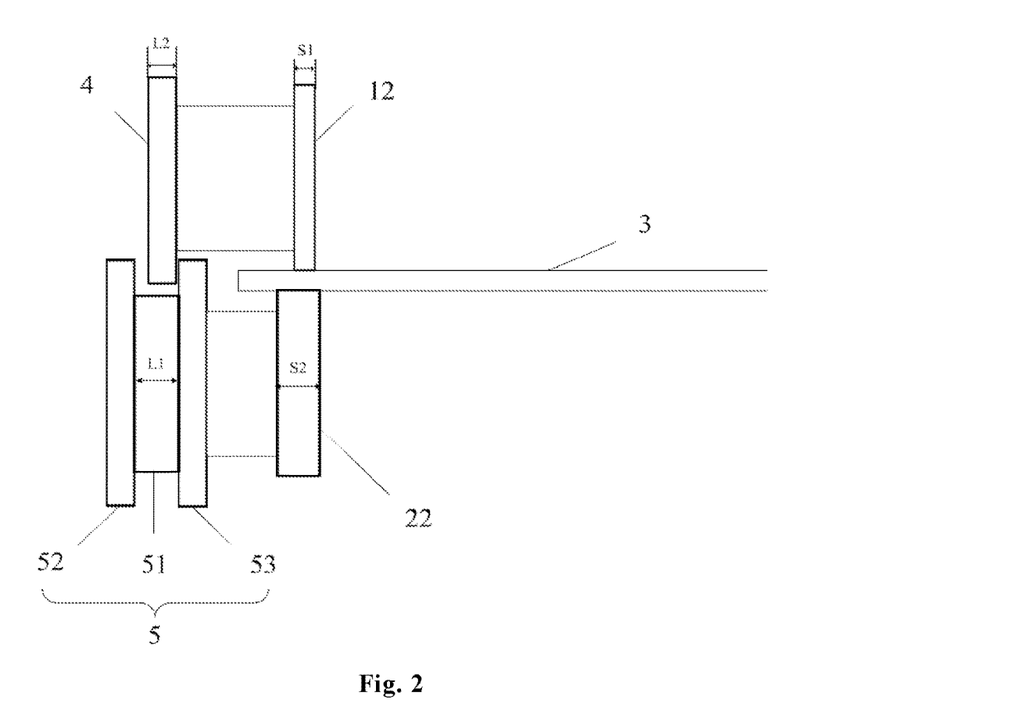
FIG. 2 is another schematic view of the roller train provided in the embodiments of the present disclosure.

It should be noted that, as shown in FIG. 2, a gap is arranged between one end of the first delimitation part 4 inserted into the groove structure and a bottom of the groove structure, so as to prevent energy loss due to friction between the end of the first delimitation part 4 and the bottom of the groove structure. Moreover, because a direction along which a width of the groove structure is measured, a direction along which a thickness of the first delimitation part 4 is measured, a direction along which a thickness of a roller body of the first roller 1 is measured and a direction along which a thickness of a roller body of the second roller 2 is measured are the same in the roller train provided in the embodiments of the present disclosure and are all identical to a direction of the central line of the axial of the first roller 1, the first delimitation part 4 and the second delimitation part 5 may delimit the axial displacement between the first roller 1 and the second roller 2 along the direction of the axial thereof. Moreover, the width L1 of the groove structure is greater than the thickness L2 of the first delimitation part 4, i.e., $L1-L2=\Delta L>0$; and the thickness S1 of the roller body of the first roller 1 is smaller than the thickness S2 of the roller body of the second roller 2, i.e., $S2-S1=\Delta S>0$; and $\Delta L<\Delta S$. In this way, an amount of the axial displacement of the first roller 1 relative to the second roller 2 may be delimited, such that the amount of the axial displacement is no more than $\Delta L$. Therefore, the deformation or even crush of the substrate 3 as a result of the amount of the axial displacement being overlarge may be prevented effectively when the first roller 1 and the second roller 2 are in operation. Moreover, by setting the width L1 of the groove structure to be larger than the thickness L2 of the first delimitation part 4 in the embodiments of the present disclosure, it may be ensured that the first delimitation part 4 and the groove structure of the second delimitation part 5 do not contact with each other in normal conditions, and energy loss due to friction may be avoided. Meanwhile, since the thickness S1 of the roller body of the first roller 1 is set to be smaller than the thickness S2 of the roller body of the second roller 2 in the embodiments of the present disclosure, no deformation or crush of the substrate 3 being conveyed may occur, even if a slight misalignment occurs between the first roller 1 and the second roller 2.

Specifically, as shown in FIG. 1, the first roller 1 in the roller train provided in the embodiments of the present disclosure includes a first axis 11 and a first roller body 12 sleeved onto the first axis 11. The first delimitation part 4 is sleeved onto the first axis 11 and is connected with the first roller body 12 with a certain distance existing between the first delimitation part 4 and the first roller body 12. In this way, the first delimitation part 4 sleeved onto the first axis 11 may be driven to move when the first roller body 12 is displaced, so that the axial displacement of the first roller body 12 may be delimited by the first delimitation part 4. Similarly, the second roller 2 includes a second axis 21 and a second roller body 22 sleeved onto the second axis 21, the second delimitation part 5 is sleeved onto the second axis 21 and is connected with the second roller body 22 with a certain distance existing between the second delimitation part 5 and the second roller body 22. In this way, the second delimitation part 5 sleeved onto the second axis 21 may be driven to move when the second roller body 22 is displaced, so that the axial displacement of the second roller body 22 of the second delimitation part 5 may be delimited by the second delimitation part 5. Moreover, the first roller body 12 may contact the upper surface of the substrate 3, the second roller body 22 may contact the lower surface of the substrate 3, so as to convey the substrate 3 by friction forces between the substrate 3 and the first roller body 12 and between the substrate 3 and the second roller body 22.

The first roller body 12 and the first delimitation part 4 may be formed integrally, and the second roller body 22 and the second delimitation part 5 may also be formed integrally. The first roller body 12 and the first delimitation part 4 may be fixedly connected to each other as a result of being forming integrally, so that the axial displacement of the first roller body 12 may be transferred to the first delimitation part 4 and the first delimitation part 4 may be displaced axially and synchronously with the first roller body 12 of the first roller 1. Similarly, the second roller body 22 and the second delimitation part 5 may also be fixedly connected to each other, so that the axial displacement of the second roller body 22 may be transferred to the second delimitation part 5 and the second delimitation part 5 may be displaced axially and synchronously with the second roller body 22 of the second roller 2. As a result, the misalignment between the first roller 1 and the second roller 2 may be prevented by the cooperation between the first delimitation part 4 and the second delimitation part 5, and the possibility of deformation or even crush of the substrate 3 may be reduced.

Moreover, the first roller body 12 and the first delimitation part 4 may also be separated from each other and be connected with each other, so that an installation of the first delimitation part 4 may be more flexible, the distance between the first delimitation part 4 and the first roller body 12 may be kept, and further a certain distance may be kept between the first delimitation part 4 and the substrate 3. In this way, the first delimitation part 4 would not affect a conveying process of the substrate 3. Similarly, the second roller body 22 and the second delimitation part 5 may also be separated from each other and be connected with other, so that an installation of the second delimitation part 5 may be more flexible, the distance between the second delimitation part 5 and the second roller body 22 may be kept, and further a certain distance may be kept between the second delimitation part 5 and the substrate 3. In this way, the second delimitation part 5 would not affect the conveying process of the substrate 3.

As an example, in case that the first roller body 12 and the first delimitation part 4 are separated from and connected with each other and the second roller body 22 and the second delimitation part 5 are separated from and connected with each other, the first roller body 12 may be connected with the first delimitation part 4 by a first connection member 13 and the second roller body 22 may be connected with the second delimitation part 5 by a second connection member 23, wherein both the first connection member 13 and the second connection member 23 are fastening knobs.

As shown in FIG. 1, the first delimitation part 4 is sleeved onto the first axis 11 by a first fastening knob 6, so that the first delimitation part 4 may be connected with the first axis 11. The second delimitation part 5 is sleeved onto the second axis 21 by a second fastening knob 7, so that the second delimitation part 5 may be connected with the second axis 21. The first fastening knob 6 is located at left side of the first delimitation part 4, and the first connection member 13 is located at a right side of the first delimitation part 4 and contacts the first delimitation member 13. The first roller body 12 is located at the right side of the first delimitation part 4 and contacts the first connection member 13 at a left side of the first roller body 12. The second fastening knob 7 is located at a left side of the second delimitation part 5, and the second connection member 23 is located at a right side of the second delimitation part 5 and contacts the second delimitation part 5. The second roller body 22 is located at a right side of the second delimitation part 5 and contacts the second connection member 23 at a left side of the second roller body 22.

Figure 3:
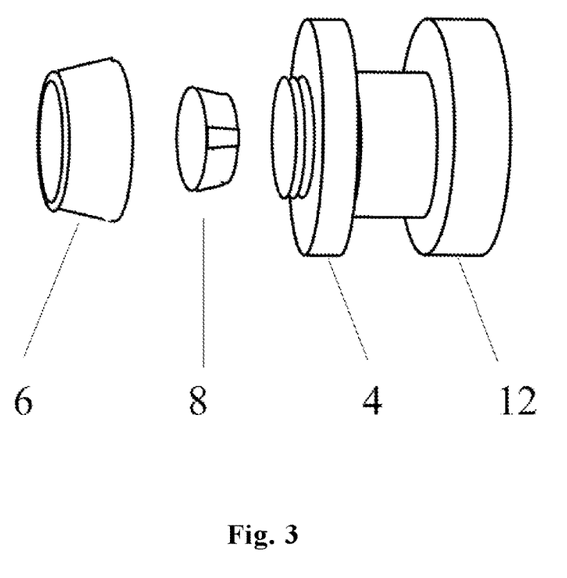
FIG. 3 is an exploded schematic view of a first roller body and a first delimitation part provided in the embodiments of the present disclosure.
Figure 4:
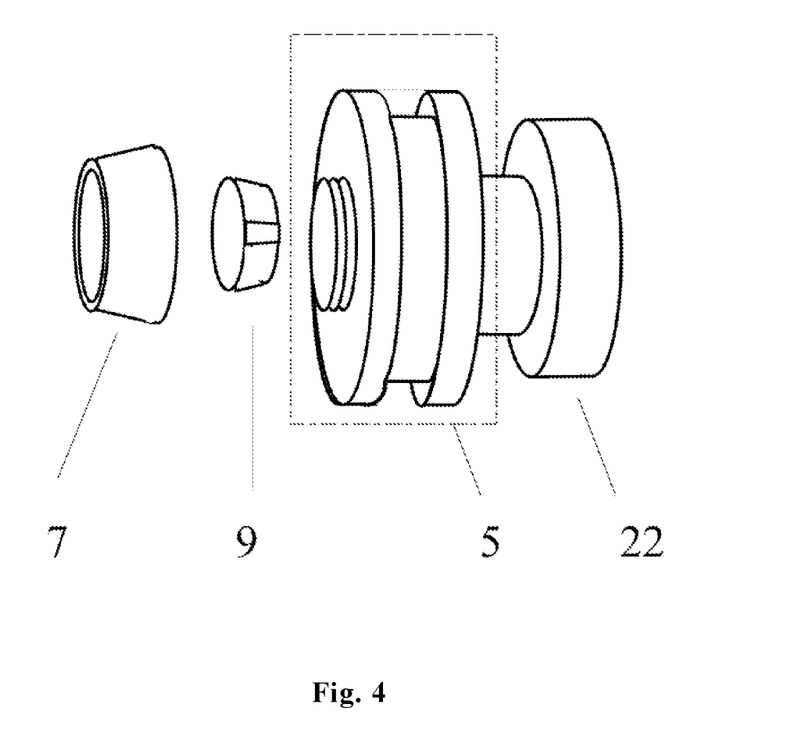
FIG. 4 is an exploded schematic view of a second roller body and a second delimitation part provided in the embodiments of the present disclosure.
Figure 5:
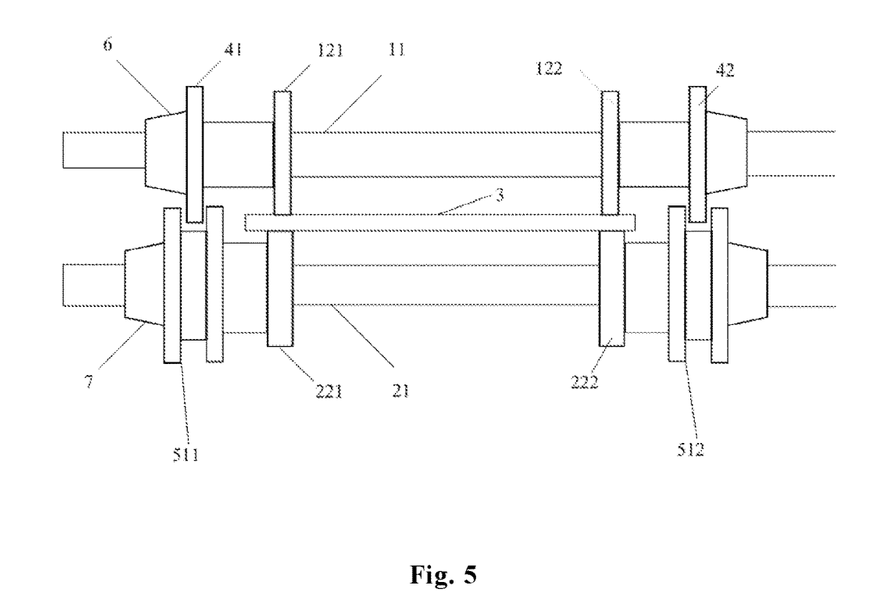
FIG. 5 is another schematic view of the roller train provided in the embodiments of the present disclosure.

It may be understood that, the first delimitation part 4 is fixed on the first axis 11 by a first expansion washer 8 and the first fastening knob 6, as shown in FIG. 3. The second delimitation part 5 is fixed onto the second axis 21 by a second expansion washer 9 and the second fastening knob 7, as shown in FIG. 4.

It should be noted that, the number of the first roller body 12 sleeved onto the first axis 11 may be set according to actual requirements. Generally, two first roller bodies 12 are sleeved onto the first axis 11, and are called a first left roller body 121 and a first right roller body 122 hereinafter. Accordingly, two first delimitation parts 4 are provided, and are called a first left delimitation part 41 and a first right left delimitation part 42 hereinafter.

Specifically, the first left delimitation part 41 is sleeved onto a left end of the first axis 11, and the first right delimitation part 42 is sleeved onto a right end of the first axis 11. In this way, an axial displacement of the first left roller body 121 and an axial displacement of the first right roller body 122 may be delimited by the first left delimitation part 41 and the first right delimitation part 42 synchronously. Both The first left roller body 121 and the first right roller body 122 are located between the first left delimitation part 41 and the first right delimitation part 42. The first left roller body 121 is close to the first left delimitation part 41, and the first right roller body 122 is close to the first right delimitation part 42. The first left roller body 121 is connected with the first left delimitation part 41 and is spaced apart from the first left delimitation part 41 by a certain distance, and the first right roller body 122 is connected with the first right delimitation part 42 and is spaced apart from the first right delimitation part 42 by a certain distance. Both the first left roller body 121 and the first right roller body 122 contact the upper surface of the substrate 3.

Similarly, two second roller bodies 22 are sleeved onto the second axis 21 and are called a second left roller body 221 and a second right roller body 222 hereinafter. Accordingly, two second delimitation parts 5 are provided and are called a second left delimitation part 511 and a second right delimitation part 512 hereinafter. Specifically, the second left delimitation part 511 is sleeved onto a left end of the second axis 21, and the second right delimitation part 522 is sleeved onto a right end of the second axis 21. In this way, an axial displacement of the second left roller body 221 and an axial displacement of the second right roller body 222 are delimited by the second left delimitation part 511 and the second right delimitation part 512 synchronously, so as to prevent the misalignment between the first roller 1 and the second roller 2 and reduce the possibility of deformation or even crush of the substrate 3. Both the second left roller body 221 and the second right roller body 222 are located between the second left delimitation part 511 and the second right delimitation part 512. The second left roller body 221 is close to the second left delimitation part 511, and the second right roller body 222 is close to the second right delimitation part 512. The second left roller body 221 is connected with the second left delimitation part 511 and spaced apart from the second left delimitation part 512 by a certain distance, and the second right roller body 222 is connected with the second right delimitation part 512 and is spaced apart from the second right delimitation part 512 by a certain distance. Both the second left roller body 221 and the second right roller body 222 contact the lower surface of the substrate 3, so that the second left roller body 221 and the second right roller body 222 contacting the lower surface of the substrate 3 cooperate with the first left roller body 121 and the second right roller body 122 contacting the upper surface of the substrate 3 to convey the substrate 3 smoothly.

Figure 6:
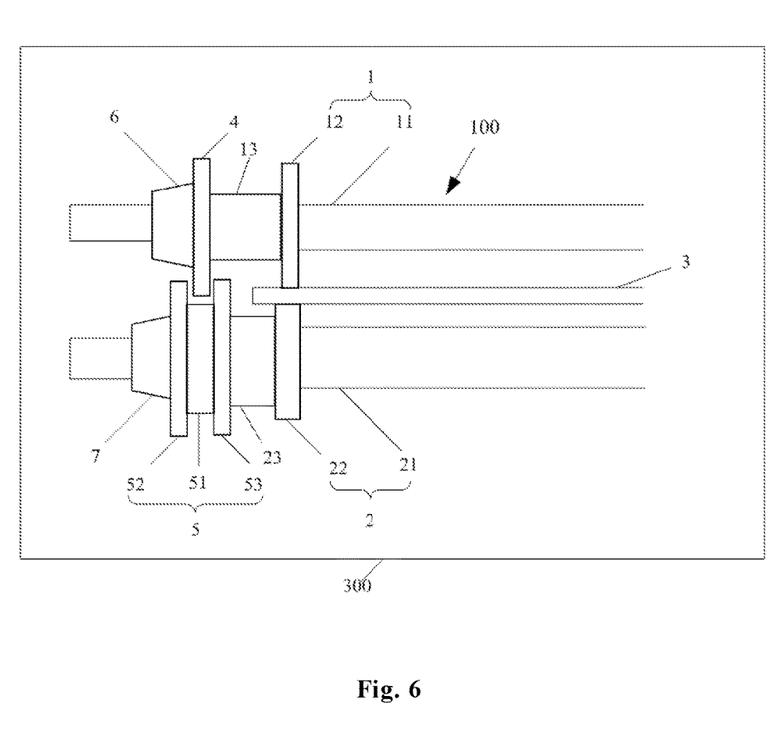
FIG. 6 is a schematic view of a substrate conveying device provided in the embodiments of the present disclosure.

The embodiments of the present disclosure further provide a substrate conveying device 300 including the above roller train provided in the embodiments of the present disclosure. Compared with the related substrate conveying device, beneficial effects of the substrate conveying device 300 provided in the embodiments of the present disclosure are the same as the roller train provided in the above embodiments, no further description will be given herein.

In description of the above embodiments, the specific features, structures, materials or characteristics may be combined in any one or more embodiments or examples in an appropriate manner. The above descriptions are only specific implementations of the present disclosure, but the protection scope of the present disclosure is not limited thereto. Changes or replacements that may be easily devised by those skilled in the art within the technical scope of the present disclosure should all fall within the protection scope of the present disclosure. Therefore, the protection scope of the present disclosure should be defined by the protection scope of the claims.

What is claimed is:

1. A roller train for conveying a substrate, comprising:
a first roller comprising a first delimitation part and a first roller body, and
a second roller comprising a second delimitation part and a second roller body,
wherein an axial line of a first axis of the first roller is parallel to that of a second axis of the second roller, the first roller body contacts an upper surface of the substrate, the second roller body contacts a lower surface of the substrate, and
the first delimitation part is arranged on the first axis of the first roller and configured to delimit an axial displacement of the first roller, the second delimitation part is arranged on the second axis of the second roller and configured to delimit an axial displacement of the second roller, the first delimitation part and the second delimitation part cooperate with each other to prevent misalignment between the first roller and the second roller, wherein a projection of the first roller body on the substrate overlaps with a projection of the second roller body on the substrate.

2. The roller train according to claim 1, wherein the first delimitation part is a ring-shape structure, and an axial line of the ring-shape structure coincides with the axial line of the first roller.

3. The roller train according to claim 1, wherein the second delimitation part is located at a first side of the second roller and comprises a second delimitation body, a first delimitation plate and a second delimitation plate,
the first delimitation plate is arranged on a first side of the second delimitation body, and the second delimitation plate is arranged on a second side of the second delimitation body, and the second delimitation body, the first delimitation plate and the second delimitation plate are sleeved onto the second axis of the second roller, and
the second delimitation body, the first delimitation plate and the second delimitation plate are ring-shape structures and form a groove structure together, the first delimitation part is inserted into the groove structure and is displaceable axially inside the groove structure.

4. The roller train according to claim 3, wherein one end of the first delimitation part is inserted into the groove structure, and a gap is arranged between the one end of the first delimitation part and a bottom of the groove structure.

5. The roller train according to claim 3, wherein a width L1 of the groove structure is larger than a thickness L2 of the first delimitation part, $L1-L2=\Delta L>0$,
a thickness S1 of the first roller body of the first roller is smaller than a thickness S2 of the second roller body of second roller, $S2-S1=\Delta S>0$, and $\Delta L<\Delta S$;
wherein a direction along which the width of the groove structure is measured, a direction along which the thickness of the first delimitation part is measured, a direction along which the thickness of the first roller body of the first roller is measured, and a direction along which the thickness of the second roller body of the second roller is measured are identical to a direction of the axial line of the first roller.

6. The roller train according to claim 1, wherein the first roller body is sleeved onto the first axis, the second roller body is sleeved onto the second axis;
the first delimitation part is sleeved onto the first axis, and the second delimitation part is sleeved onto the second axis;
the first delimitation part is connected with the first roller body and is spaced apart from the first roller body, the second delimitation part is connected with the second roller body and is spaced apart from the second roller body.

7. The roller train according to claim 6, wherein the first roller body and the first delimitation part are formed integrally, and the second roller body and the second delimitation part are formed integrally.

8. The roller train according to claim 6, wherein the first roller body and the first delimitation part are separated from each other, and the second roller body and the second delimitation part are separated from each other.

9. The roller train according to claim 8, wherein the first roller body and the first delimitation part are connected with each other by a first connection member, and the second roller body and the second delimitation part are connected with each other by a second connection member.

10. The roller train according to claim 6, wherein the first delimitation part is sleeved onto the first axis by a first fastening knob, and the second delimitation part is sleeved onto the second axis by a second fastening knob;
the first fastening knob is located at a first side of the first delimitation part, and the first roller body is located at a second side of the first delimitation part,
the second fastening knob is located at a first side of the second delimitation part, and the second roller body is located at a second side of the second delimitation part,
the first side of the first delimitation part is identical to the first side of the second delimitation part, and the second side of the first delimitation part is identical to the second side of the second delimitation part.

11. The roller train according to claim 6, wherein the first delimitation part is sleeved onto the first axis by a first fastening knob and a first expansion washer, and the second delimitation part is sleeved onto the second axis by a second fastening knob and a second expansion washer;
the first fastening knob and the first expansion washer are located at the first side of the first delimitation part, the first roller body is located at the second side of the first delimitation part, and the first expansion washer is located between the first fastening knob and the first delimitation part;

the second fastening knob and the second expansion washer are located at the first side of the second delimitation part, the second roller body is located at the second side of the second delimitation part, and the second expansion washer is located between the second fastening knob and the second delimitation part;

the first side of the first delimitation part is identical to the first side of the second delimitation part, and the second side of the first delimitation part is identical to the second side of the second delimitation part.

12. The roller train according to claim 6, wherein the first delimitation part comprises a first left delimitation part and a first right delimitation part, the first roller body comprises a first left roller body and a first right roller body, the first left delimitation part is sleeved onto a left end of the first axis, the first right delimitation part is sleeved onto a right end of the first axis, and both the first left roller body and the first right roller body are located between the first left delimitation part and the first right delimitation part, the first left roller body is close to the first left delimitation part, the first right roller body is close to the first right delimitation part, the first left roller body is connected with the first left delimitation part and is spaced apart from the first left delimitation part, the first right roller body is connected with the first right delimitation part and is spaced apart from the first right delimitation part, and both the first left roller body and the first right roller body contact the upper surface of the substrate;

the second delimitation part comprises a second left delimitation part and a second right delimitation part, the second roller body comprises a second left roller body and a second right roller body, the second left delimitation part is sleeved onto a left end of the second axis, the second right delimitation part is sleeved onto a right end of the second axis, both the second left roller body and the second right roller body both are located between the second left delimitation part and the second right delimitation part, the second left roller body is close to the second left delimitation part, the second right roller body is close to the second right delimitation part, the second left roller body is connected with the second left delimitation part and is spaced apart from the second left delimitation part, the second right roller body is connected with the second right delimitation part and is spaced apart from the second right delimitation part, and both the second left roller body and the second right roller body contact the lower surface of the substrate.

13. The roller train according to claim 2, wherein the first roller body is sleeved onto the first axis, the second roller body is sleeved onto the second axis, the first delimitation part is sleeved onto the first axis, and the second delimitation part is sleeved onto the second axis;

the first delimitation part is connected with the first roller body and is spaced apart from the first roller body, and the second delimitation part is connected with the second roller body and is spaced apart from the second roller body.

14. The roller train according to claim 3, wherein the first roller body is sleeved onto the first axis, and the second roller body is sleeved onto the second axis, the first delimitation part is sleeved onto the first axis, the second delimitation part is sleeved onto the second axis;

the first delimitation part is connected with the first roller body and is spaced apart from the first roller body, and the second delimitation part is connected with the second roller body and is spaced apart from the second roller body.

15. The roller train according to claim 4, wherein the first roller body is sleeved onto the first axis, the second roller body is sleeved onto the second axis, the first delimitation part is sleeved onto the first axis, and the second delimitation part is sleeved onto the second axis; and the first delimitation part is connected with the first roller body and is spaced apart from the first roller body, and the second delimitation part is connected with the second roller body and is spaced apart from the second roller body.

16. The roller train according to claim 5, wherein the first roller body is sleeved onto the first axis, the second roller body is sleeved onto the second axis, the first delimitation part is sleeved onto the first axis, and the second delimitation part is sleeved onto the second axis; and the first delimitation part is connected with the first roller body and is spaced apart from the first roller body, and the second delimitation part is connected with the second roller body and is spaced apart from the second roller body.

17. A substrate conveying device, comprising: the roller train according to claim 1.

18. A roller train for conveying a substrate, comprising: a first roller comprising a first delimitation part, and a second roller comprising a second delimitation part, wherein an axial line of a first axis of the first roller is parallel to that of a second axis of the second roller, the first roller contacts an upper surface of the substrate, the second roller contacts a lower surface of the substrate, and the first delimitation part is arranged on the first axis of the first roller and configured to delimit an axial displacement of the first roller, the second delimitation part is arranged on the second axis of the second roller and configured to delimit an axial displacement of the second roller, the first delimitation part and the second delimitation part cooperate with each other to prevent misalignment between the first roller and the second roller, wherein the second delimitation part is located at a first side of the second roller and comprises a second delimitation body, a first delimitation plate and a second delimitation plate, the first delimitation plate is arranged on a first side of the second delimitation body, and the second delimitation plate is arranged on a second side of the second delimitation body, and the second delimitation body, the first delimitation plate and the second delimitation plate are sleeved onto the second axis of the second roller, and the second delimitation body, the first delimitation plate and the second delimitation plate are ring-shape structures and form a groove structure together, the first delimitation part is inserted into the groove structure and is displaceable axially inside the groove structure.

19. The roller train according to claim 18, wherein the first delimitation part is a ring-shape structure, and an axial line of the ring-shape structure coincides with the axial line of the first roller.

20. The roller train according to claim 18, wherein one end of the first delimitation part is inserted into the groove structure, and a gap is arranged between the one end of the first delimitation part and a bottom of the groove structure.

\* \* \* \* \*